United States Patent [19]

Koncz

[11] 4,364,750

[45] Dec. 21, 1982

[54] PROCESS AND APPARATUS FOR PURIFYING WASTE GASES

[75] Inventor: Attila P. Koncz, Mississauga, Canada

[73] Assignee: Canadian Fine Color Company, Limited, Toronto, Canada

[21] Appl. No.: 232,567

[22] Filed: Feb. 9, 1981

[51] Int. Cl.³ .......................................... B01D 47/00
[52] U.S. Cl. ...................................... 55/89; 55/90; 55/94; 55/222; 55/228; 55/230; 55/259; 261/116; 261/117; 261/90; 261/152
[58] Field of Search ................. 55/85, 89, 80, 90–94, 55/222, 223, 227, 228, 230, 237, 259, 400, 406; 261/116, 21, 117, 22, 90, 152

[56] References Cited

U.S. PATENT DOCUMENTS

| 584,344 | 6/1897 | Geradin et al. | 55/222 |
|---|---|---|---|
| 1,979,189 | 10/1934 | Bowers | 55/94 |
| 2,579,282 | 12/1951 | Vicard | 55/94 |
| 3,016,979 | 1/1962 | Schmid | 55/230 |
| 3,593,496 | 7/1971 | Merrill | 55/93 |
| 3,616,604 | 11/1971 | Schouw | 55/230 |
| 3,619,983 | 11/1971 | Rohr | 55/89 |
| 3,648,435 | 3/1972 | Soria et al. | 55/230 |
| 3,960,992 | 6/1976 | Cyrenne | 55/223 |
| 4,000,993 | 1/1977 | Holl | 55/94 |
| 4,067,703 | 1/1978 | Dullien et al. | 55/92 |

FOREIGN PATENT DOCUMENTS 77930 11/1918 Switzerland .................... 55/259

OTHER PUBLICATIONS

York—The Demister, York Co., West Orange, N.J., Bulletin 41, pp. 1–4, 4/70.

*Primary Examiner*—Bernard Nozick

[57] ABSTRACT

Process and apparatus is disclosed for purifying waste gases containing minute pollutant liquid and solid particles. The process comprises treating the gas stream with a fine spray of scrubbing liquid by introducing into the gas stream the spray of droplet size in range of 1 micron or less. The scrubbing liquid is mixed with pollutant particles to wet and enlarge them in a turbulent region without appreciably increasing the pressure of the gaseous stream. The mixed gas stream is passed out of the turbulent region to a zone for removing the enlarged conglomerated contaminate particles from the gas stream. Apparatus is disclosed in which the process is carried out.

28 Claims, 5 Drawing Figures

PROCESS AND APPARATUS FOR PURIFYING WASTE GASES

FIELD OF THE INVENTION

This invention relates to apparatus for and process of purifying a waste gas stream primarily containing minute pollutant liquid and solid particles. More particularly, the process and apparatus are adapted to remove pollutant particles as small as one micron or less in an efficient manner.

BACKGROUND OF THE INVENTION

Several approaches have been taken in the past to remove contaminants from waste gas streams, which may arise from various sources, where the contaminants may be in vaporous of particulate form of liquid or solid nature. A well known standard approach for removing contaminants from a waste gas stream is to pass countercurrently through the gas stream a scrubbing solution. Such scrubbing solution may be sprayed downwardly in a scrubbing tower where the gases move upwardly through the tower. The tower may be of the packed type having various forms of packing well known in the art to enhance the gas liquid contact for removing vaporous contaminants. Other approaches for removing particulate contaminants involve spraying either cocurrently or countercurrently to the air flow, a spray which wets the particles and causes them to fall out under the influence of gravity or the wetted particles may be separated from the gas stream by using various types of centrifugal treatments.

Canadian Pat. No. 352,850 and U.S. Pat. Nos. 2,195,707, 2,763,982, 3,651,622, 3,653,187 and 4,067,703 disclose various approaches to introducing a scrubbing spray into the gas stream and then separating the wetted particulate contaminants from the gas stream by passing the treated gas stream through various types of centrifugal separation devices which may be in the form of centrifugal fans.

Alternate approaches involve the introduction of a spray into the gas stream for purposes of wetting the particles with the spray and removing the particles by collecting them on the walls of the apparatus, or by filtration. Such devices are disclosed in U.S. Pat. Nos. 2,858,903, 2,935,375 and 3,016,979. There is, however, no consideration given in this last approach to using any form of device which would cause a vigorous mixing of the fine spray of scrubbing solution into the gas stream to enhance the wetting of the particulate contaminants. In addition, one of these approaches, as disclosed in U.S. Pat. No. 2,935,375, requires high energy input in the use of a venturi which necessitates considerable horsepower to drive the air compressor to accomplish removal. For example, a 200 horsepower motor may be necessary so that the velocity of the stream of gas, as it passes through the venturi, would be increased from 3,000 feet per minute to about 18,000 feet per minute at the point of constriction in the venturi in order to achieve the desired atomization of the introduced spray in the gas stream.

Further difficulty encountered with the prior art approaches is that none of them have produced an economical energy efficient approach to removing very minute particulate contaminants which may be as small as one micron in size.

It is, therefore, an object of this invention to provide an efficient removal of small minute particulate liquid and/or solid contaminants from a waste gas stream. Such object may be applied to the removal of contaminants from a waste gas stream which is generated in a drying oven for freshly printed materials.

SUMMARY OF THE INVENTION

The process, according to the invention, purifies a waste gas stream containing minute contaminate liquid and solid particles as small as one micron or less. The process comprises treating the gas stream with a fine spray of scrubbing liquid by introducing into the gas stream the spray of a droplet size in the range of one micron or less. The introduced scrubbing luquid is mixed with the pollutent particles in a turbulent region without appreciably increasing the pressure of the gaseous stream. Such mixing enhances the conglomeration of pollutant particles with scrubbing droplets to form larger particles. The mixed gas stream is passed out of the turbulent region and delivered to an area for removing the enlarged conglomerated contaminant particles from the gas stream to purify it.

Apparatus for purifying the waste gas stream comprises a turbulence generator capable of generating turbulence in the gas stream to a degree represented by Reynolds number of in the range $D1 \times 10^6$ or more without appreciably increasing the pressure of the gas stream. Means delivers the gas stream to an intake of the turbulence generator and second means delivers the gas stream away from a exhaust of the turbulence generator. Means introduces into the gas a scrubbing spray of liquid of droplet size in the range of one micron or less. The spray means is located within the intake delivery means and upstream of the turbulence generator. The exhaust delivery means delivers the mixed gas stream and scrubbing liquid which forms enlarged particles containing the contaminants to means for removing the enlarged particles from the gas stream to purify the waste gas stream.

BRIEF DESCRIPTION OF THE DRAWINGS

Preferred embodiments of the invention are illustrated in drawings wherein:

FIG. 5 is a section through the turbulence generator and preceding duct containing the tertiary atomized spray device.

DETAILED DESCRIPTION OF THE PREFERRED EMBODIMENTS

Figure 1:
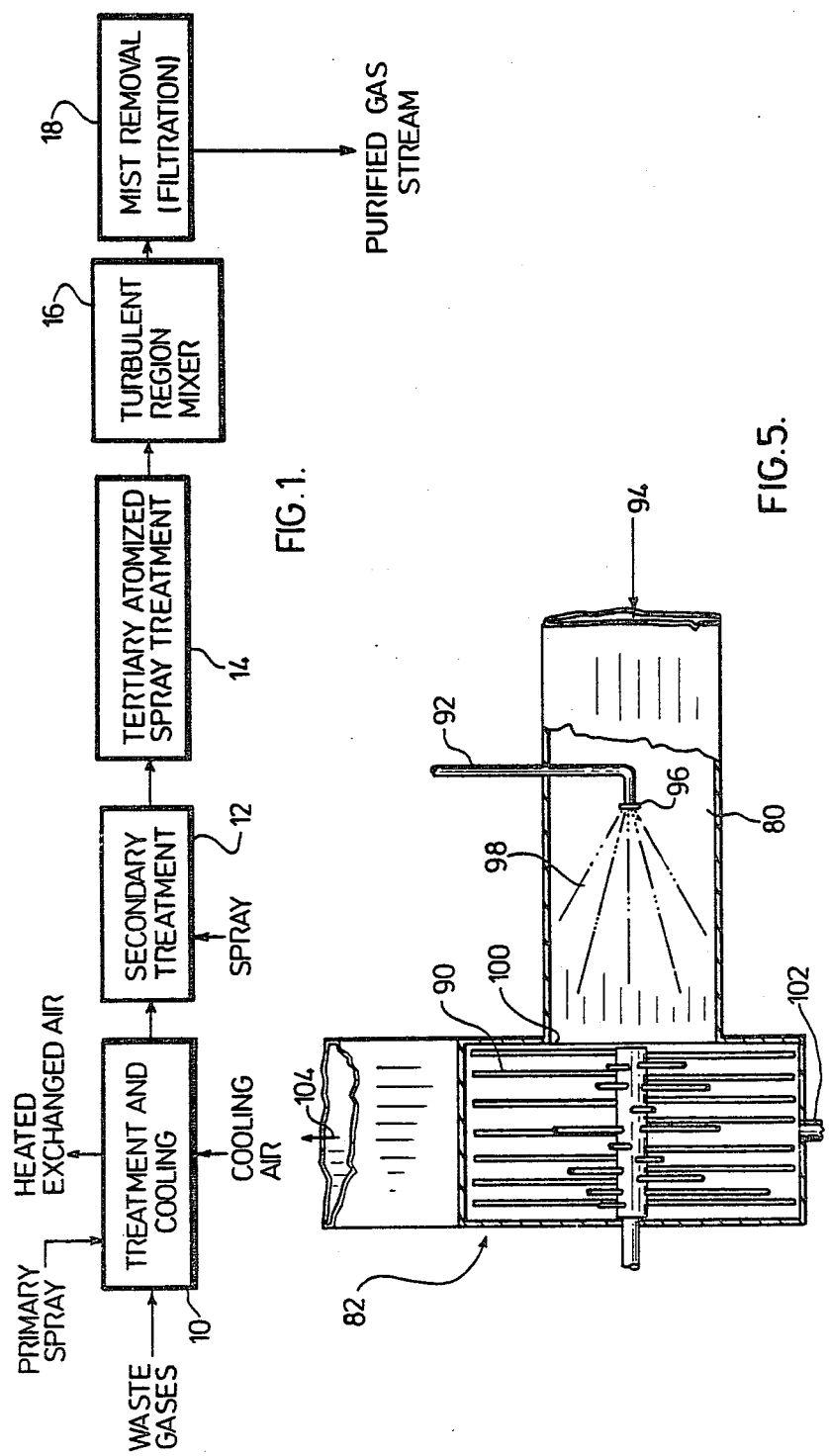
FIG. 1 is a block diagram schematically illustrating the various steps in the process of the invention.

Referring to FIG. 1, the overall sequential steps for treating waste gases are shown. The waste gases, which contain pollutant vapours, and particles in the liquid and/or solid state, are introduced to a treatment and cooling zone 10. The waste gases are treated with a primary spray of scrubbing liquid which is sprayed into the waste gas stream. The primary spray, as shown, is introduced to the treatment zone 10. The spray droplets agglomerate with the pollutant particles to enlarge the particles where the enlarged particles fall out of the waste gas stream under the influence of gravity. In order to cool the incoming waste gases which may be at elevated temperatures, cooling air is introduced into the treatment zone and heat exchanged with the waste gases via a heat exchanger, such that the waste gases as now primarily treated and cooled emerged from the primary treatment zone 10. The waste gases are then passed to a secondary treatment zone 12, wherein a secondary spray is introduced into the waste gas stream to scrub further contaminants from the waste gas stream. Depending upon the makeup of the waste gases, usually after primary and secondary treatments in zones 10 and 12, the gas stream contains very fine particulate liquid and solid contaminants which may be in the range of one micron or less.

To remove such finely divided contaminants in the waste gas stream, which are of low concentration, the waste gas stream is passed to a tertiary treatment zone 14. In this zone a very finely divided spray of scrubbing liquid is introduced into the waste gas stream. Such spray may be of droplet size in the range of one micron or less to correspond with the size of the particulate contaminants. The spray may be introduced into the waste gas stream in either a cocurrent or countercurrent manner to cause a contacting of the fine spray droplets with the minute contaminants. It is preferred, however, that the spray be introduced cocurrently. The waste gas stream is passed to a turbulent region mixer 16, wherein a very high degree of turbulence is induced in the waste gas stream by a generator which has the capability, in combination with related components, of not appreciably increasing the pressure of the gas stream as it is passed through the mixing region. In the mixing region, the very finely divided scrubbing spray droplets are brought into contact with the remaining contaminants to enlarge the contaminant sizes. The waste gas stream is continuously removed from the turbulent region and passed to a mist removal device 18. The removal device 18 removes essentially all of the remaining enlarged particulate contaminants from the waste gas stream to give the purified gas stream.

Figure 2:
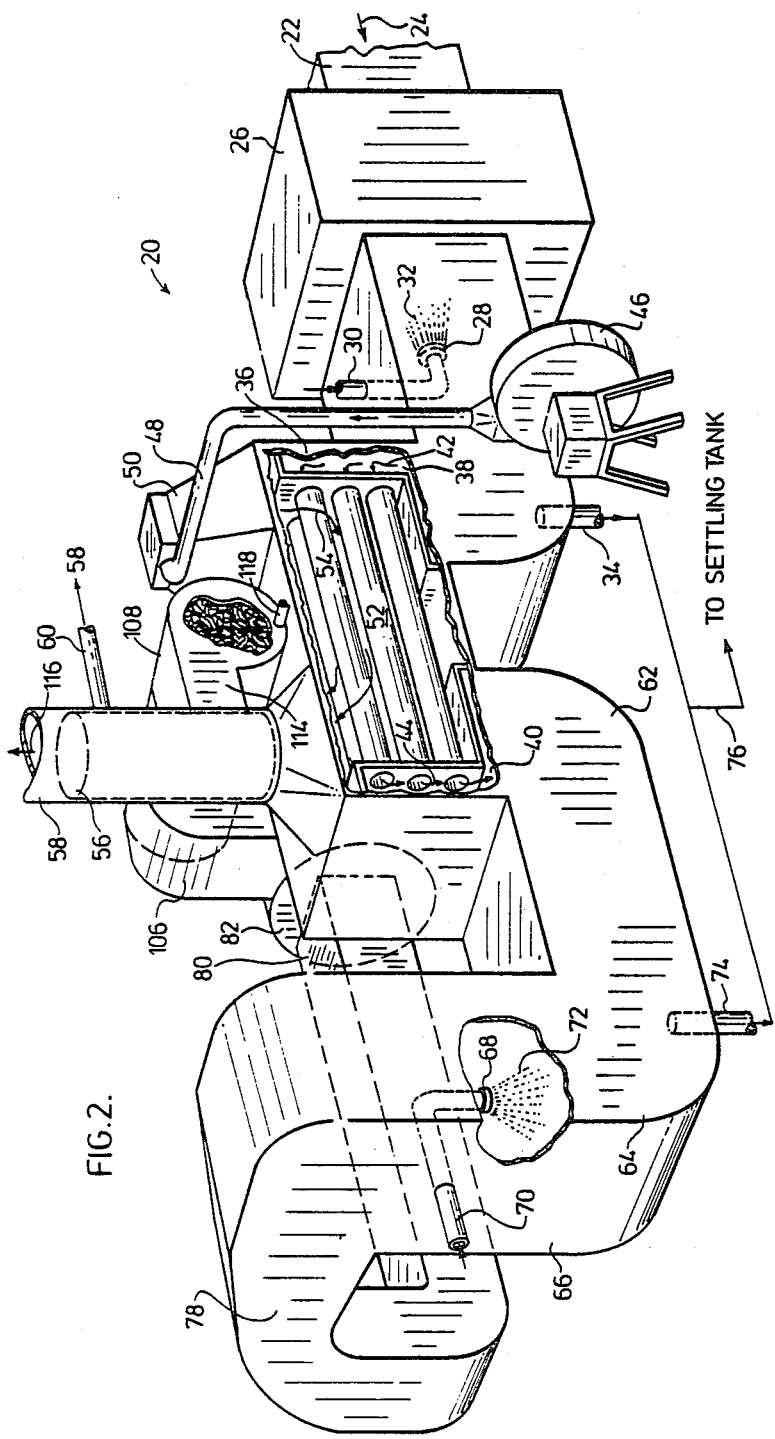
FIG. 2 is a perspective view of the apparatus according to this invention in which the process is carried out for separating contaminants from waste gases derived from a printing ink drying oven.

Referring to FIG. 2, an apparatus is shown in which the process, according to this invention, is carried out. The waste gas stream is introduced into the apparatus 20 via duct 22 in the direction of arrow 24. The waste gases may be that removed from a drying oven for printing inks and the like. Such waste gases are usually at elevated temperatures as removed from the drying oven. In addition, a fan or the like may be located before duct 24 to withdraw the waste gases from the drying oven and pass them under pressure through the treatment apparatus 20. Thus this fan acts as the prime mover of the waste gases through the system. There may be a preliminary cooling of the waste gases in duct 24 before treatment in the primary treatment and cooling zone. With reference to FIG. 1, the primary spray is directed into duct 22 having the enlarged treatment area 26 via spray nozzle 28. The nozzle is fed with pressurized scrubbing liquid through line 30. As shown, the spray 32 from nozzle 28 is directed in countercurrent relationship to the flow of waste gases 24. The droplet size from nozzle 28 may be relatively large compared to droplet spray in the tertiary treatment zone, such droplet size in spray 32 may be in the region of 50 to 100 microns. The primary treatment zone effects a removal of the larger contaminants in the waste gas stream, where the droplets, as they combine with the particulate liquid and solid contaminants, cause such contaminants to fall out of the air stream onto the base of duct 22. Such contaminants, as entrained in the spent scrubbing liquid as it settles out of the waste gas stream onto the base of duct 22, are collected and removed from the duct via drain pipe 34.

The waste gas stream, after primary treatment spray, is passed upwardly into a heat exchanger 36 which has an inlet at 38 and is of the tube type heat exchanger having an outlet at 40. Arrows 42 and 44 geneerally indicate the passage of the waste gas stream through the heat exchanger 36. Fresh cool air is introduced into the heat exchanger 36 via centrifugal fan 46, where via ducting 48 is directed to the inlet cowling 50 of the heat exchanger. The air passes over the tubes 52 in the heat exchanger in the direction of arrows 54 to cool the waste gases as they pass through the tubes 52. The cooling air flows in the direction of arrows 54 and passes up outlet plenum 56 shown in dot within stack 58 and is removed from the plenum 56 in the direction of arrow 58 via ducting 60. The heated air may be recirculated to a plant for heating purposes or exchanged in some other manner to derive energy from the cooled waste gas stream.

In passing the waste gas stream downwardly into ducting 62, the gases leave the primary treatment and cooling zone and pass into the secondary treatment zone. The waste gases, as they pass through ducting 62, turn upwardly around elbow 64 into vertical ducting 66. Located in the upper region of ducting 66 is a secondary spray nozzle 68 which is fed with pressurized scrubbing solution via line 70. The scrubbing solution is sprayed downwardly as represented by spray 72 and thus countercurrently of the flow of waste gases. The spray 72 may be of a droplet size similar to that from nozzle 28 in the primary treatment zone, where removal of remaining larger contaminants and more of the vapours from the waste gas stream is effected. The enlarged contaminant particles, as wetted by the spray, fall out of the waste gas stream down to the base of ducting 62. The spent scrubbing liquid with contaminants is removed from the ducting 62 via drain 74. The spent scrubbing liquids, as gathered by drains 34 and 74 and as gathered from other drains such as the drain from the base of the turbulence generator shown in more detail in FIG. 3, are delivered to a common line 76 which passes all collected spent scrubbing liquids to a settling tank which will be described in more detail with respect to FIG. 4.

In spraying the secondary treatment spray 72 downwardly and countercurrently, the spray, as it mixes with the waste gas stream, works under the influence of gravity to precipitate out of the waste gas stream the larger particles, where the particle weight is sufficient to overcome any buoying effect of the waste gas stream as if flows upwardly in ducting 66. Ducting 66 via U-shaped ducting 78 leads to horizontal duct work 80 which is attached to the intake of the turbulence generator 82.

Figure 3:
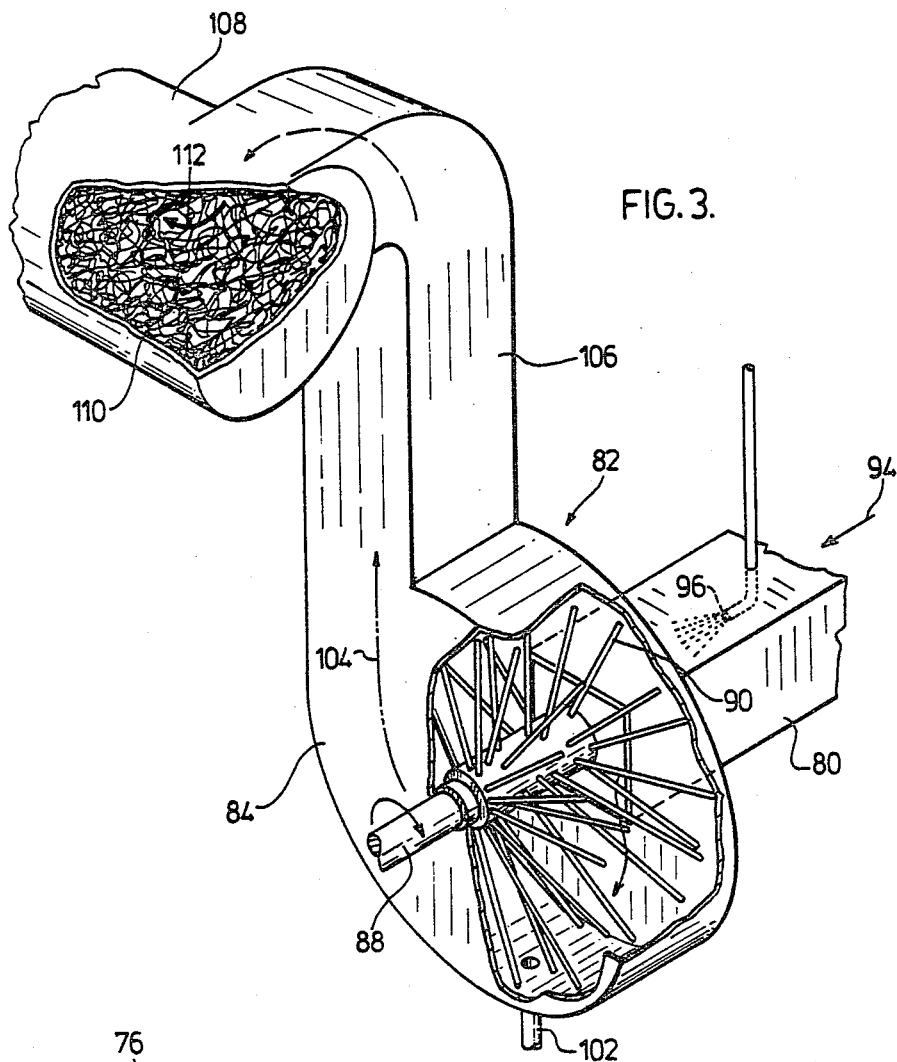
FIG. 3 is a perspective view of the turbulence generator and filter device for removing fine particulate contaminants.

Referring to FIG. 3, ducting 80, as leading into the turbulence generator 82, is shown in more detail. The turbulence generator 82 has a housing 84 which houses the device for generating the turbulence in the treated waste gas stream. According to a preferred embodiment, the turbulence generator comprises a rotor bearingly mounted at 86 in the housing and having a drive shaft 88 driven in the direction of the arrow. The rotor 86 has projecting therefrom a plurality of projections which, according to this preferred embodiment, are in the form of spikes 90 extending from the rotor. The spikes 90 serve to generate a high degree of turbulence in the waste gas stream. This is accomplished by rotating the rotor at very high speeds, such as rpms in the ranges of 2,000 to 6,000 rpm for a rotor having a diameter of approximately 36 inches. This generates in the waste gas stream turbulence in the region represented by Reynolds numbers in the range of of $1\times 10^6$ to $1\times 10^8$. The turbulence gernerator 82 serves to provide a highly turbulent mixing region for mixing the tertiary spray introduced via line 92 into the waste gas stream travelling in the direction of arrow 94.

The tertiary treatment spray has nozzle 96 which, as shown in FIG. 5, introduces a fan type spray 98 into the ducting 80. The nozzle 96 is of the type which introduces the scrubbing solution in a very fine spray of droplet sizes in the range of one micron or less. The gas stream 94 is moving preferably in the same direction as the spray, thus the spray is introduced in a cocurrent manner, as they move towards intake 100 of the turbulence generator 82. The spikes 90 in contacting the gases exert high sheer stresses on the waste gas stream to cause a high degress of turbulence within the housing 84 of the turbulence generator. This effects a high degree of mixing of the finely disbursed scrubbing particles with remaining contaminants to thereby effect a wetting and/or absorption/adsorption of such contaminants. Some of the contaminants, if the droplets are sufficiently enlarged, may settle out on the housing 84 of the turbulence generator and thus are removed from the turbulence generator via drain 102 which, as mentioned, may be tied in with the drain lines of the other primary and secondary treatment areas and transferred to the settling tanks via line 76. In addition to these droplets which settle out in the turbulence generator, large droplets which have not settled out after the secondary spray have been found to settle out also onto the housing 84.

The waste gases pass out of the turbulence generating area in a continuous manner in the direction of arrow 104. Referring to FIG. 3, the waste gases, as they contain the enlarged particulate contaminants, move upwardly in ducting 106 into a filtration region 108, which according to this preferred embodiment, contains a compact arrangement of wire mesh 110 which serves to remove essentially all of the remaining wetted contaminant particles from the waste gas stream as the gas is passed over the wire mesh in the direction of arrow 112. The gas stream is sufficiently humidified with water vapour that the liquid contaminant particles, which deposit on the wire mesh do not appreciably evaporate into the now purified gas stream. This is due to the vapour pressure of the removed liquid droplets being less than the vapour pressure of the water droplets in the humidified air.

Turning to FIG. 2, the gases, as they pass through the filtration system, pass out of the filtration device via ducting 114 into stack 58 and are then exhausted to atmosphere in the direction of arrow 116, as it passes over the plenum 56 for the fresh air cooling medium. The collected particulate droplets, as removed in the wire mesh, may settle out in the base of filtration device 108 and are removed, therefrom, via drain 118 and may be joined with the remaining spent scrubbing liquids and returned to the settling tank via line 76.

Figure 4:
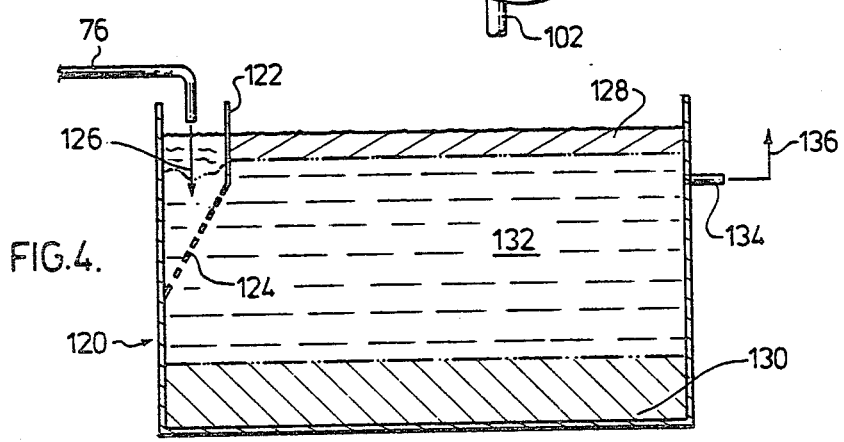
FIG. 4 is a section through a settling tank used in the regeneration of the spent scrubbing liquids.

The spent scrubbing liquids, as returned to settling tank via line 76, are introduced into the settling tank 120, as shown in FIG. 4, via an equalization chamber 122 having perforated lower region 124 to break up the frothing action of the scrubbing solution as introduced in the direction of arrow 126. The settling tank of FIG. 4 is of sufficient length of achieve a settling out of the contaminants. An upper scum layer is formed at 128 and the heavier particulate contaminants separate out on the bottom of the settling tank 120 in the region of 130. This leaves an intermediate layer 132 of scrubbing liquid which is withdrawn from the tank at 134 and passed back to the various feed lines of the spray nozzles via lines 136. The scrubbing liquid, as separated out in the region of 132, may contain some residuals of the liquid contaminants. This has been found to be advantageous, particularly in situations where the initial scrubbing solution is water, so as to provide a common element in attracting and wetting of the vaporous contaminants in duct 22. Surfactants may be incorporated in the scrubbing liquid to assist the wetting of the contaminant particles. Thus, a scrubbing solution is generated after initial use of the device which, in containing common components to the particulate contaminants to be removed, increases the efficiency of the scrubbing of the contaminants from the waste gas stream.

The following is an example of the various components used in the apparatus of FIG. 2 for effecting a high degree of removal of contaminants from the waste gas stream. It is appreciated, of course, that this example simply demonstrates a preferred mode in carrying out the invention and is not to be constructed in any way as limiting the scope of the claims. Waste gases from a drying oven of a printing press are directed to the apparatus of FIG. 2 for purification. For every 1,000 cubic feet of waste gas treated, a total of 1.56 gallons of scrubbing solution is introduced via the primary, secondary and tertiary scrubbing group. Of this total amount of scrubbing solution used, approximately 0.33 gallons are introduced via the fine mist tertiary spray. The nozzles used for the primary and secondary sprays are hydraulic nozzles which form droplet sizes in the range of 20 to 100 microns. An air atomizing nozzle is used to provide the finely divided tertiary spray of approximately 1 micron or less. For the above conditions, 85% to 95% efficiencies in removal of contaminate particles from the waste gas strem were realized.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A process for purifying a waste gas stream containing minute pollutant liquid and solid particles as small as 1 micron or less, said process comprising treating said gas stream with a fine spray of scrubbing liquid by introducing into said gas stream said spray of a droplet size in the range of 1 micron or less, generating in said gas stream by agitation a turbulent region without appreciably increasing the pressure of said gas stream, said turbulent region having a Reynolds number measure of turbulence in the range of $1\times 10^6$ to $1\times 10^8$, mixing the introduced scrubbing liquid and pollutant particles in said turbulent region to enhance thereby the conglomeration of pollutant particles with scrubbing droplets to form larger particles and passing the mixed gas stream out of said turbulent region and removing the enlarged conglomerated contiminate particles from the gas stream to purify it.

2. A process of claim 1 further comprising collecting the spray droplets and removed contaminate particles and passing the collected material to a settling tank, allowing the material to settle to form a layer of sludge and layer of liquid substantially free of contaminate particles and respraying said liquid layer as the scrubbing liquid.

3. A process of claim 1, wherein said spray is introduced concurrently into said gas stream.

4. A process of claim 1, comprising generating said turbulent region in a compartment housing a rotor having a plurality of projections extending therefrom, said rotor being rotated at high speeds in the range of 2000 to 6000 rpm.

5. A process of claim 1, wherein said scrubbing liquid is delivered at a rate of approximately 0.33 gallons per 1,000 cubic feet of air treated.

6. A process of claim 1, wherein said scrubbing liquid is sprayed at elevated temperatures to cause evaporation thereof and thereby decrease the droplet size to assist in its absorption of contaminate particles.

7. A process of claim 1, comprising removing the enlarged contaminate particles in wire mesh filter pads.

8. In a process for scrubbing minute pollutant liquid and solid particles as small as 1 micron or less from a waste gas stream a scrubbing liquid being introduced into the gas stream and subsequently passing the treated gas stream into a particle separator; the improvement comprising spraying into said gas stream a scrubbing liquid of a droplet size in the range of 1 micron or less, generating by agitation a relatively high turbulent region without appreciably increasing the pressure of the gas stream, said turbulent region having a Reynolds number measure of turbulence in the range of $1\times 10^6$ to $1\times 10^8$, mixing the introduced scrubbing liquid and pollutant particles in said relatively high turbulent region to contact pollutant particles with scrubbing droplets which form enlarged particles, passing such mixed gas stream out of said turbulent region and filtering the enlarged pollutant particles from the gas stream to purify it.

9. In a process of claim 8, introducing said scrubbing liquid concurrently into said gas stream.

10. In a process of claim 8, pretreating said waste gas stream comprising spraying a scrubbing liquid of droplet size greater than 1 micron countercurrent the flow of said stream to effect a removal of larger contaminate particles, thereby leaving a gas stream to be treated containing primarily small pollutant particles of 1 micron or less.

11. In a process of claim 8, comprising generating said turbulent region in a compartment housing a rotor having a plurality of projections extending therefrom, said rotor being rotated at high speeds in the range of 2000 to 6000 rpm.

12. In a process of claim 8, comprising removing the enlarged particles in wire mesh filter pads.

13. In a process of claim 8, delivering said scrubbing liquid at a rate of approximately 0.33 gallons per 1,000 cubic feet of air treated.

14. In a process of claim 8, spraying said scrubbing liquid at an elevated temperature to cause evaporation thereof and thereby decrease droplet size to assist in its absorption of smaller contaminate particles.

15. In a process of claim 8, collecting spent scrubbing liquid which includes contaminate particles, passing collected spent liquid to a settling tank, allowing the collected liquid to settle and recycling the separated liquid layer for respraying.

16. In a process of claim 9, adapted for purifying waste gases from a printing ink drying oven for printed materials, heat exchanging the hot waste gases from the oven to cool same and cause a condensation of some vapourous contaminates.

17. In a process of claim 16, comprising introducing countercurrently into the gas stream a scrubbing liquid spray prior to heat exchanging the gas stream.

18. In a process of claim 17, comprising introducing a secondary countercurrent scrubbing liquid spray into the gas stream after heat exchanging the gas stream and prior to treatment with said spray of droplet size of 1 micron or less.

19. In a process of claim 18, settling out under the influence of gravity the enlarged contaminate particles.

20. In a process of claim 19, directing the gas stream upwardly and spraying downwardly into the gas stream to provide said secondary spray treatment.

21. In a process of claim 20, collecting the contaminates as they fall downwardly under the influence of gravity in said upwardly flowing stream and passing collected contaminates in scrubbing liquid to a settling tank.

22. Apparatus for purifying a waste gas stream containing minute pollutant liquid and solid particles as small as 1 micron or less, said apparatus comprising a turbulence generator capable of generating by agitation turbulence in the gas stream of a degree represented by a Reynolds number of $1\times 10^6$ to $1\times 10^8$ without appreciably increasing the pressure of the gas stream, means for delivering the gas stream to an intake of said turbulence generator and second means for delivering the gas stream away from an exhaust of said turbulence generator, means for introducing into the gas stream a scrubbing spray of liquid droplet size in the range of 1 micron or less, said spray means being located within said intake delivery means and upstream of said turbulence generator, said exhaust delivery means delivering the mixed gas stream and scrubbing liquid which forms enlarged particles containing the contaminates to means for filtering the enlarged particles from the gas stream to purify the waste gas stream.

23. Apparatus of claim 22, wherein said means introduces said scrubbing spray concurrently into said gas stream.

24. Apparatus of claim 22, wherein said turbulence generator is housed in a housing having its intake and exhaust connected respectively to the intake and exhaust delivery means, a rotor mounted for high speed rotation within said housing, said rotor having a plurality of projections extending therefrom of a configuration which, when said rotor is rotated at speeds in the range of 2000 to 6000 rpm, produces said high degree of turbulence in the gas stream stream.

25. Apparatus of claim 22, wherein said spray means includes a nozzle located centrally of the cross-section of said intake delivery means, said nozzle adapted to spray the scrubbing solution which is delivered to said nozzle under high pressure, in droplet form of 1 micron or less.

26. Apparatus of claim 22, wherein said filter means comprises a plurality of wire mesh pads on which the enlarged pollutant particles deposit.

27. Apparatus of claim 26, wherein means is provided for collected scrubbing liquid from said primary and secondary treatment zones, said turbulence generator and said filter means, said collection means deliverying collected spent scrubbing liquid to a settling tank, recycling the liquid layer of said settling tank for respraying into the gas stream.

28. Apparatus of claim 22 adapted for purifying waste gases from an oven used for drying inks on freshly printed material, said apparatus further comprising primary and secondary treatment zones prior to the introduction of the tertiary spray near said turbulence generator, said primary treatment zone comprising means for delivering the gas stream through said primary treatment zone, means for spraying countercurrently a scrubbing solution, said primary delivery means being of sufficient length to allow the larger deroplets to settle out, said primary delivery means being connected to a heat exchanger for reducing the temperature of the gas stream to effect condensation of some of the vapourous contaminates, a delivery means for delivering the gas stream away from said heat exchanger to said intake delivery means, the secondary treatment zone comprising a second countercurrent spray means for spraying a scrubbing solution into the gas stream, said secondary delivery means being of sufficient length to allow larger droplets to fall out of the gas stream to leave thereby a gas stream containing predominantly pollutant particles as small as 1 micron or less.

* * * * *